(12) United States Patent
Huth et al.

(10) Patent No.: US 9,935,821 B2
(45) Date of Patent: Apr. 3, 2018

(54) METHOD FOR CONFIGURING ONE OR MORE DEVICES IN AN ETHERNET-BASED COMMUNICATION NETWORK

(75) Inventors: Hans-Peter Huth, Munich (DE); Andreas Zirkler, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 547 days.

(21) Appl. No.: 13/994,299

(22) PCT Filed: Dec. 13, 2011

(86) PCT No.: PCT/EP2011/072611
§ 371 (c)(1),
(2), (4) Date: Jun. 14, 2013

(87) PCT Pub. No.: WO2012/080251
PCT Pub. Date: Jun. 21, 2012

(65) Prior Publication Data
US 2013/0275566 A1 Oct. 17, 2013

(30) Foreign Application Priority Data
Dec. 17, 2010 (DE) .......... 10 2010 063 437

(51) Int. Cl.
*H04L 12/24* (2006.01)
*H04L 29/08* (2006.01)
*H04L 12/26* (2006.01)

(52) U.S. Cl.
CPC .......... *H04L 41/0803* (2013.01); *H04L 41/12* (2013.01); *H04L 67/125* (2013.01);
(Continued)

(58) Field of Classification Search
CPC .......... H04L 41/0803; H04L 12/24
(Continued)

(56) References Cited

U.S. PATENT DOCUMENTS 4,546,351 A * 10/1985 Nambu ........... G06F 13/368
370/449
5,699,350 A * 12/1997 Kraslavsky ........... 370/254
(Continued)

FOREIGN PATENT DOCUMENTS

DE 101 60 385 6/2002

OTHER PUBLICATIONS

IT Law Wiki, "Field device", 2015.*
(Continued)

*Primary Examiner* — Ondrej C Vostal
(74) *Attorney, Agent, or Firm* — Cozen O'Connor

(57) ABSTRACT

A method for configuring at least one device in an Ethernet-based communication network comprising a plurality of devices with Ethernet capability, wherein the topological position of a respective device to be configured, which is associated with a device type, in the communication network is ascertained, the respective device is sent configuration data, which correspond to its device type and to its ascertained topological position, from a database which contains a plurality of configuration data for at least one device type and a plurality of topological positions of the at least one device type, and the respective device is then configured based on the transmitted configuration data.

11 Claims, 2 Drawing Sheets

(52) U.S. Cl.
CPC .......... *H04L 67/18* (2013.01); *H04L 41/0206* (2013.01); *H04L 43/0805* (2013.01); *H04L 67/34* (2013.01); *Y02B 60/43* (2013.01); *Y02B 60/44* (2013.01)

(58) Field of Classification Search
USPC ........................................................ 709/220
See application file for complete search history.

(56) References Cited

U.S. PATENT DOCUMENTS

| | | | | |
|---|---|---|---|---|
| 5,933,478 | A * | 8/1999 | Ozaki .................... | H04L 12/58 340/7.29 |
| 6,032,208 | A * | 2/2000 | Nixon et al. ................... | 710/64 |
| 6,640,239 | B1 * | 10/2003 | Gidwani .......... | H04L 29/06027 370/353 |
| 6,640,308 | B1 * | 10/2003 | Keyghobad et al. ......... | 713/300 |
| 6,958,677 | B1 * | 10/2005 | Carter .......................... | 340/10.1 |
| 7,606,890 | B1 * | 10/2009 | Baier et al. .................... | 709/224 |
| 7,672,319 | B1 * | 3/2010 | Heath et al. .................. | 370/401 |
| 7,693,966 | B2 | 4/2010 | Schmid | |
| 7,702,487 | B2 * | 4/2010 | Sherrill et al. ................ | 702/188 |
| 8,279,874 | B1 * | 10/2012 | Lu ...................... | H04L 41/0806 370/395.2 |
| 8,401,154 | B2 * | 3/2013 | Boni ...................... | H04M 11/04 370/352 |
| 8,438,270 | B2 * | 5/2013 | Nappier et al. ............... | 709/224 |
| 8,443,065 | B1 * | 5/2013 | White ................ | H04L 12/4625 370/254 |
| 8,805,982 | B1 * | 8/2014 | Wilsey .................... | H04L 41/12 370/254 |
| 8,806,031 | B1 * | 8/2014 | Kondur .............. | H04L 41/0886 370/389 |
| 8,856,360 | B2 * | 10/2014 | Achan et al. ................. | 709/228 |
| 9,130,835 | B1 * | 9/2015 | White ................ | H04L 41/0806 |
| 2002/0124114 | A1 * | 9/2002 | Bottom ................ | H04L 49/351 709/251 |
| 2003/0018757 | A1 * | 1/2003 | Saito ................ | H04L 29/12113 709/220 |
| 2003/0018767 | A1 * | 1/2003 | Chatani .................. | H04L 29/06 709/223 |
| 2003/0035445 | A1 * | 2/2003 | Choi ...................... | H04J 3/1611 370/535 |
| 2003/0179714 | A1 * | 9/2003 | Gilgenbach ............ | H04B 3/546 370/252 |
| 2004/0158619 | A1 * | 8/2004 | Pedersen ................. | H04L 29/06 709/219 |
| 2005/0114474 | A1 * | 5/2005 | Anderson ........... | H04L 41/0213 709/220 |
| 2005/0174998 | A1 * | 8/2005 | Vesterinen et al. ........... | 370/354 |
| 2006/0020684 | A1 * | 1/2006 | Mukherjee .............. | H04L 67/06 709/219 |
| 2006/0050681 | A1 * | 3/2006 | Monteiro et al. ............. | 370/352 |
| 2007/0025240 | A1 * | 2/2007 | Snide ............................ | 370/217 |
| 2008/0130517 | A1 * | 6/2008 | Lee et al. ...................... | 370/254 |
| 2008/0177998 | A1 * | 7/2008 | Apsangi et al. .............. | 713/155 |
| 2008/0219184 | A1 * | 9/2008 | Fowler ................ | H04L 43/0811 370/254 |
| 2008/0219247 | A1 * | 9/2008 | Ford ........................ | H04L 45/00 370/360 |
| 2008/0285186 | A1 * | 11/2008 | Kothari .................. | H02H 9/008 361/56 |
| 2009/0116404 | A1 * | 5/2009 | Mahop et al. ................ | 370/254 |
| 2009/0232028 | A1 * | 9/2009 | Baalbergen ......... | H04L 41/0803 370/255 |
| 2009/0303883 | A1 * | 12/2009 | Kucharczyk ........ | H04L 12/4645 370/241 |
| 2010/0165878 | A1 * | 7/2010 | Soni ..................... | G05B 19/052 370/254 |
| 2010/0169467 | A1 * | 7/2010 | Shukla ................... | H04L 49/70 709/220 |
| 2010/0191837 | A1 | 7/2010 | Linden et al. | |
| 2010/0205281 | A1 * | 8/2010 | Porter .................... | H04L 41/12 709/220 |
| 2010/0246439 | A1 * | 9/2010 | Heath .................... | H04W 4/02 370/254 |
| 2010/0290467 | A1 * | 11/2010 | Eisenhauer ............. | H04L 41/00 370/392 |
| 2010/0299401 | A1 * | 11/2010 | Lloyd .......................... | 709/209 |
| 2011/0221607 | A1 * | 9/2011 | Ramanathan ....... | H04L 12/6418 340/686.6 |
| 2011/0258257 | A1 * | 10/2011 | Previdi ........................ | 709/205 |
| 2012/0155321 | A1 * | 6/2012 | Yang et al. .................. | 370/254 |
| 2013/0275566 | A1 * | 10/2013 | Huth ....................... | H04L 41/12 709/220 |

OTHER PUBLICATIONS

Rostan, "Industrial Ethernet Technologies", 2014.*
Jaspemeite, "Fieldbus integration to the realtime ethernet standard PROFINET", 2005.*
Hussain, "Self-configuring adaptive Networks", 2009.*
Ferrari et al., "Experimental evaluation of PROFINET performance", 2004.*
Vonnahme et al., "Measurements in Switched Ethernet Networks Used for Automation Systems", 2000.*
Microsoft Computer Dictionary, "device independence", 2002.*
Microsoft Computer Dictionary, "independent content provider", 2002.*
Avaya, "802.1X Authentication, Link Layer Discovery Protocol (LLDP), and Avaya IP Telephones", 2006.*
Bierman et al., "Physical Topology MIB", RFC 2922, 2000.*
Extreme Networks, "Link Layer Discovery Protocol (LLDP) A New Standard for Discoverying and Managing Coverged Network Devices", 2006.*
Siemens, "57-CPs for Industrial Ethernet", 2013.*
Srinivasan, "Tutorial on the Link Layer Discovery Protocol", 2005.*
TIA, "Telecommunications IP Telephony Infrastructure Link Layer Discovery Protocol for Media Endpoint Devcies", Scope, Standard: TIA-1057 available for purchase, 2006.*
Tschofenig et al., "How secure is the next generation of IP-based emergency services architecture?", 2009.*
Wikipedia, "Link Layer Discovery Protocol", 2017.*
Ashtarifar et al., "A Link Layer Solution to Location Identification of Emergency VoIP Callers", 2010.*
Attar et al., "Network Discovery Protocol LLDP and LLDP-MED", 2010.*
Congdon, "Link Layer Discovery Protocol and MIB v2.0", 2002.*
Dawson, "The Internet locaiton services model", 2008.*
Imtiaz et al., "A Novel Method for Auto Configuration of Realtime Ethernet Networks", 2008.*
Lai et al., "Using the vulnerability information of computer systems to improve the network security", 2007.*
Sigholm, "Automated Network Node Discovery and Topology Analysis", 2007.*
Verma, "Chapter 4 Discovery", "Principles of Computer Systems and Network Management", 2009.*
Winterbottom et al., "The Internet Location Service", 2010.*
Essen et al., "Broadcom BCM5600 StrataSwitch", "A Highly Integrated Ethernet Switch on a Chip", 1999.*
Office dated Mar. 4, 2015 which issued in the corresponding Chinese Patent Application No. 2011800591701.

* cited by examiner

METHOD FOR CONFIGURING ONE OR MORE DEVICES IN AN ETHERNET-BASED COMMUNICATION NETWORK

CROSS-REFERENCE TO RELATED APPLICATIONS

This is a U.S. national stage of application No. PCT/EP2011/072611 filed 13 Dec. 2011. Priority is claimed on German Application No. 10 2010 063 437.9 filed 17 Dec. 2010, the content of which is incorporated herein by reference in its entirety.

BACKGROUND OF THE INVENTION

Field of the Invention

The invention relates to a communication network and method for configuring at least one device in an Ethernet-based communication network comprising a plurality of Ethernet-capable devices.

Ethernet-based communication networks are used for exchanging data in a multiplicity of application areas. The Ethernet protocol in this case relates to the data transmission on layer 1 and layer 2 of the Open Systems Interconnection (OSI) reference model and is specified in the Institute of Electrical and Electronic Engineers (IEEE) standard 802.3 as well as in IEEE 802.1 and IEEE 802.2. One field of application is the use of Ethernet-based communication networks in automation systems to control the performance of a corresponding automation method in a suitable manner via the communication network. In this case, the individual devices of the communication network comprise, inter alia, corresponding field devices, such as actuators or sensors, in order to execute functions within the scope of the automated method.

Individual devices in an Ethernet-based communication network are often assigned corresponding configuration data, on the basis of which the respective device is then configured. In certain application situations, it is also necessary, within the framework of the configuration, to take into account the installation location at which the device is integrated in the communication network. In a communication network for an automation system, the case can arise, for example, that a plurality of devices of identical design are used, though the devices are operated differently depending on the location at which they are installed in the automation system. According to traditional practice it must, in this case, be ascertained manually, e.g., by a service technician, at which location in the system a specific device of a specific device type is installed. The device must then be configured manually in turn, taking its installation location into account. Manually, in this context, denotes an operation that is initiated and performed by a human being, though this can by all means be accomplished with the aid of software tools.

SUMMARY OF THE INVENTION

It is an object of the invention to provide a method for configuring at least one device in an Ethernet-based communication network, so that it becomes possible to perform a location-dependent automatic configuration of the devices in a simple manner.

This and other objects and advantages are achieved in accordance with the invention by providing a communication network and method in which the topological position, within the communication network, of a particular device which is to be configured and which is assigned to a device type is determined. The concept of topological position is to be understood here and in the following in a broad sense and specifies information which, within the framework of the topology of the communication network, defines the location of the device in said network, e.g., by way of the specification of neighboring devices in the network and the cable connecting the devices. Configuration data corresponding to the respective device's device type and its determined topological position is then transmitted to the device from a database, the database containing a multiplicity of configuration data for at least one device type and different topological positions of the at least one device type. Accordingly, suitable configuration data is stored in the database as a function of both the device type and the topological position, which data is then transmitted as necessary to the device having the corresponding device type and the corresponding topological position. Following the transmission of the corresponding configuration data, the respective device finally configures itself based on the transmitted data.

The database can be both a central database in the communication network and a distributed database spread across the individual devices. In this arrangement, the administration of the database is preferably handled by a monitoring station in the communication network. Such a monitoring station can be, e.g., an engineering station when the method is used for a communication network of an automation system.

In accordance with the method of the invention, individual devices can be configured automatically without manual intervention even when a plurality of devices of the same device type are present in the communication network. This is rendered possible in that, in addition to the device, the topological position of the device in the communication network is also taken into account at configuration time, where the topological position in turn is linked to a corresponding installation location of the device. In this way, configuration errors due to a plurality of identical device types having different installation locations in the network are avoided.

As previously mentioned, the concept of topological position is to be understood in a broad sense. In a preferred embodiment, the topological position of the respective device is described by way of the direct connections that are present in the communication network between the respective device and other devices, in particular based on addresses (i.e., identifiers that are unique network-wide) of the directly connected devices, such as MAC addresses, IP addresses and/or Profinet IDs, and the ports of the devices used for the direct connection.

Methods for recognizing a corresponding network topology and, associated therewith, the topological positions of the individual devices are known from the prior art. In a particularly preferred embodiment variant the Link Layer Discovery Protocol (LLDP) is used for identifying the topology. According to this protocol, neighboring devices exchange information with one another in respect of their device identification and their device type as well as the ports used for the connection. In this case, information about the neighboring devices is stored in each device in a Management Information Base (MIB) database. The Simple Network Management Protocol (SNMP), likewise known from the prior art, can be used to access this data. This protocol is suitable generally for application within the framework of the transmission of configuration data. In other words, the SNMP protocol can be used in the step preceding the data transmission, namely the readout of corresponding device types and/or topological positions of the devices, and alternatively or in addition also for the actual transmission of the configuration data to the devices that are to be configured.

In an embodiment of the method according to the invention, a respective device that is to be configured contacts the database automatically, e.g., after connecting to the communication network, whereupon it loads the configuration data corresponding to its device type and its determined topological position from the database. The configuration data is transmitted here without the active participation of the database. In this way, a device that has been newly connected to the network can be configured very quickly.

In a further embodiment of the method according to the invention, the database is again contacted automatically by the device, where the device communicates its device type and its determined topological position to the database in the course of the database contacting process. In this case, however, the database thereupon sends the corresponding configuration data to the respective device, i.e., the database also takes on an active function in the transmission of the configuration data.

In a further embodiment of the method according to the invention, the transmission of the configuration data is initiated and executed exclusively by the database. In this case, the database detects the presence of a respective device that is required to be configured and automatically sends the detected device the configuration data corresponding to its (determined) device type and its determined topological position. In the course of identifying the device, the database can also access the device's device type and its topological position. The three embodiments just described for transmitting the configuration data can be deployed in the communication network as alternatives or also in parallel.

In a particularly preferred embodiment, the method according to the invention is used for an Ethernet-based industrial communication network (also called Industrial Ethernet) and in particular for a Profinet-based communication network. Industrial Ethernet and Profinet were developed specifically for the purpose of networking devices in automation systems and are specified in corresponding standards. The Profinet standard is specified in particular in the International Electrotechnical Commission (IEC) 61158 and IEC 61784 standards.

A preferred application case for the invention is its use in a communication network for an automation system, in particular for an industrial automation system or where appropriate also for a different automation system, such as a building automation system. In this scenario the device or devices to be configured comprises or comprise in particular one or more Ethernet switches and/or corresponding field devices that perform functions within the scope of the automated method (e.g., motors, measuring instruments or valves). An Ethernet switch is preferably integrated in each of at least some of the field devices in this case.

In addition to the above-described method, it is also an object to provide an Ethernet-based communication network comprising a multiplicity of Ethernet-capable devices, where the communication network comprises means which enable the method according to the invention or, as the case may be, one or more preferred embodiments of the method according to the invention to be performed.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the invention is described hereinbelow with reference to the below Figs., in which.

DETAILED DESCRIPTION OF THE PREFERRED EMBODIMENTS

Figure 1:
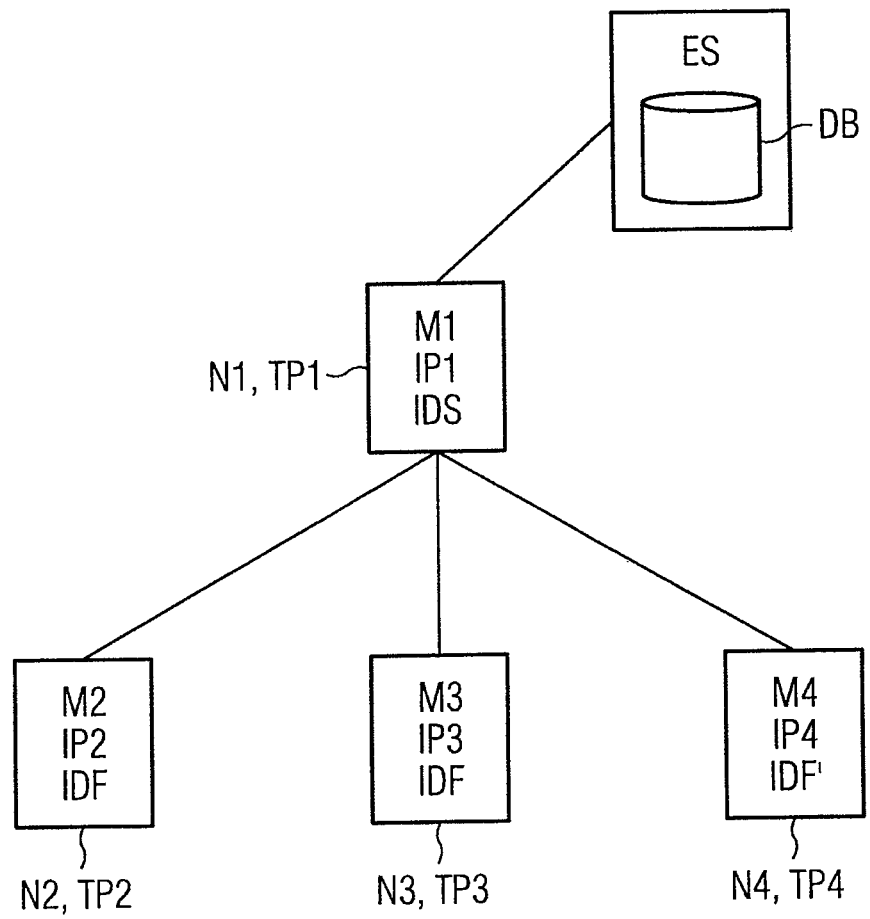
FIG. 1 shows a schematic representation of a communication network in which a embodiment of the method according to the invention is implemented.

The communication network shown in FIG. 1 relates to the networking of components of an industrial automation system which can be used, e.g., for automated manufacturing or for process automation. However, the invention is not limited to communication networks for industrial automation systems, but can also be employed in other application areas, such as e.g., building automation systems.

An industrial automation system comprises a multiplicity of components for performing an automated method. In particular, many different field devices are provided in the system, such as e.g., drives, sensors or valves, which are networked with one another via an Ethernet-based communication network, possibly with intermediate connection of Ethernet switches. Field devices having multiple ports can also be connected directly. In this case, the Ethernet switch is integrated in the device. The system additionally includes programmable logic controllers and/or PC-based controllers which likewise communicate with the switches and/or field devices via the Ethernet-based communication network. Also provided in general is a monitoring station in the form of an engineering station in which the corresponding engineering data relating to the design and layout of the automation system is managed. Among other things, this data includes the corresponding configuration data for the individual devices of the automation system. The primary task of the engineering station is to support the commissioning and diagnosis of the devices of the automation system that are networked via Ethernet.

FIG. 1 is a schematic showing only a small detail of an automation system having corresponding devices N1, N2, N3 and N4 which are connected to one another via communication lines. Communication between the devices is preferably based here on the Profinet protocol, which uses the Ethernet protocol. The device N1 is an Ethernet switch, to the ports of which three field devices N2, N3 and N4 are connected. The field devices N2 and N3 are field devices of the same device type, such as the same type of motor, whereas the field device N4 is a different device of another device type. Also indicated in FIG. 1 is an engineering station ES of the automation system that is connected to the Ethernet switch N1 via a corresponding communication line and contains a database DB in which corresponding configuration data CO for the individual devices is stored. According to FIG. 1, the database DB is shown as part of the engineering system ES, although it is also possible for the database to be a distributed database that is spread across the individual devices and is administered via the engineering station ES.

Each individual device of FIG. 1 is assigned a corresponding MAC address, which for the Ethernet switch N1 is denoted by M1 and for the field devices N2, N3 and N4 is denoted by M2, M3 and M4, respectively. At commissioning time of the communication network, IP addresses are also assigned to the devices via suitable mechanisms, in particular via Dynamic Host Configuration Protocol (DHCP) or autoconfiguration. According to FIG. 1, the devices N1, N2, N3 and N4 are assigned the corresponding IP addresses IP1, IP2, IP3 and IP4 at this time. Also stored in the individual devices, in a nonvolatile memory, are device type descriptions which can be read out therefrom, such as device ID, name, manufacturer or version number. In FIG. 1, for instance, the device type description for the Ethernet switch N1 is denoted by IDS, the identical device type descriptions for the field devices N2 and N3 by IDF, and the device type description for the field device N4 by IDF'.

Within the topology of the network shown in FIG. 1, each individual device has a different topological position, which is denoted by TP1, TP2, TP3 and TP4 for the individual devices N1, N2, N3 and N4, respectively. An essential aspect of the method according to the invention is that the topological position in the form of corresponding topological information is determined in the communication network and is then taken into account during the configuration of the individual devices.

In the embodiment of FIG. 1 the conventional LLDP protocol is used as a topology discovery method. According to this protocol, neighboring devices exchange information relating to their device identification and/or their device type. The exchanged information is stored in the respective device in what is called an Management Information Base (MIB) database. With regard to a particular device, the entries in the database include its neighboring devices with corresponding type identification as well as the number of the port to which the respective neighboring device is connected. Accordingly, the corresponding connections between neighboring devices and consequently the topological positions of the devices in the communication network are described by way of the port numbers. This information is then used to store configuration data sourced from the database DB on the individual devices not only as a function of the device type, but also as a function of the topological position of the device in the network. In this case, a multiplicity of different configurations, both for different device types and for different topological positions of the corresponding device types, are stored in the database DB. Depending on device type and topological position, the corresponding configuration information is then stored on the device that is to be configured.

According to the invention, it is therefore taken into account that the same device type can be configured differently for different installation locations. For example, drive directions of motors can vary depending on how they are arranged in the automation system. Using automatic topology detection, the corresponding topological information is collected and incorporated in an appropriate manner in the configuration. Consequently, it is possible for the devices N2 and N3 in the network according to FIG. 1 to be configured differently on account of their different topological position, in spite of their identical design.

Actual implementations of the method according to the invention are explained in the following based on the example of a new connection of a device, such as the device N2, to the communication network or automation system. Following connection of the device to the network, the device obtains information about the access point to the network, e.g., by way of the above-described LLDP protocol. The device is also recognized by surrounding neighboring devices, such that information is acquired in relation to its topological position or installation location in the network. This information is exchanged, together with device data including the type identification of the device, with the database DB of the engineering station ES, whereupon the appropriate configuration data is then stored on the device and the device is configured using the configuration data. A valid IP address is required to communicate with the database DB. As a result, after the topology has been identified a provisional IP address, for example, is allocated or determined, which address is replaced following the database access by an IP address stored therein, provided a specific IP address has been provided for the corresponding device in the configuration data. Here, the IP address represents a part of the configuration data specified on a location-dependent basis. If the configuration data does not provide a specific IP address, this can be specified at the outset using conventional methods, such as DHCP or autoconfiguration. In FIG. 1, the corresponding IP addresses of the devices N1, N2, N3 and N4 are labeled with IP1, 1P2, 1P3 and IP4, respectively.

Preferably, one of the following three embodiments is used for storing the configuration data. According to a first embodiment, the device that is to be configured contacts the database DB automatically and based on the previously acquired topological information and its device type information retrieves the corresponding configuration, which it subsequently uses for its autoconfiguration. In a second embodiment the device that is to be configured simply logs in to the database and notifies the database of its topological position and its device type. The configuration step is then performed by the database, in which case, e.g., the SNMP protocol can be used for that purpose. In a third embodiment, the database DB independently detects the presence of a newly connected device, e.g., based on changed LLDP information in corresponding MIB databases of the surrounding devices. The database then obtains the corresponding topological information as well as the device type information of the newly connected device from the newly connected device itself or from the surrounding devices. Based on this information, the appropriate configuration is then selected by the database and sent to the device, which is subsequently configured using the received configuration data.

The thus described exemplary embodiments of the method according to the invention have a number of advantages. In particular, an automatic context-dependent configuration of individual devices is made possible using both the device type and the topological position of the device. If a device is replaced by a device of the same or a compatible type, an automatic configuration of the device is possible because the installed device can be assigned to the correct device instance, without an intermediate manual step, taking into account its automatically determined topological position, with the result that the correct configuration data will be stored on the device. An incorrect configuration, e.g., due to the automatic configuration of an identical device installed at a different point or of a device reinstalled at a different point, is precluded as a result of its topological position being taken into account. When devices that have been newly connected to the communication network are put into operation for the first time, there is no need for any manual effort to assign devices of identical design to the respective device instances specified in the engineering phase of the system, because the device instances can be identified automatically based on the network topology defined in the engineering phase. At the same time, the method can also contribute toward discovering differences that can arise between a planned and an actual topology e.g. as a result of installation errors.

Figure 2:
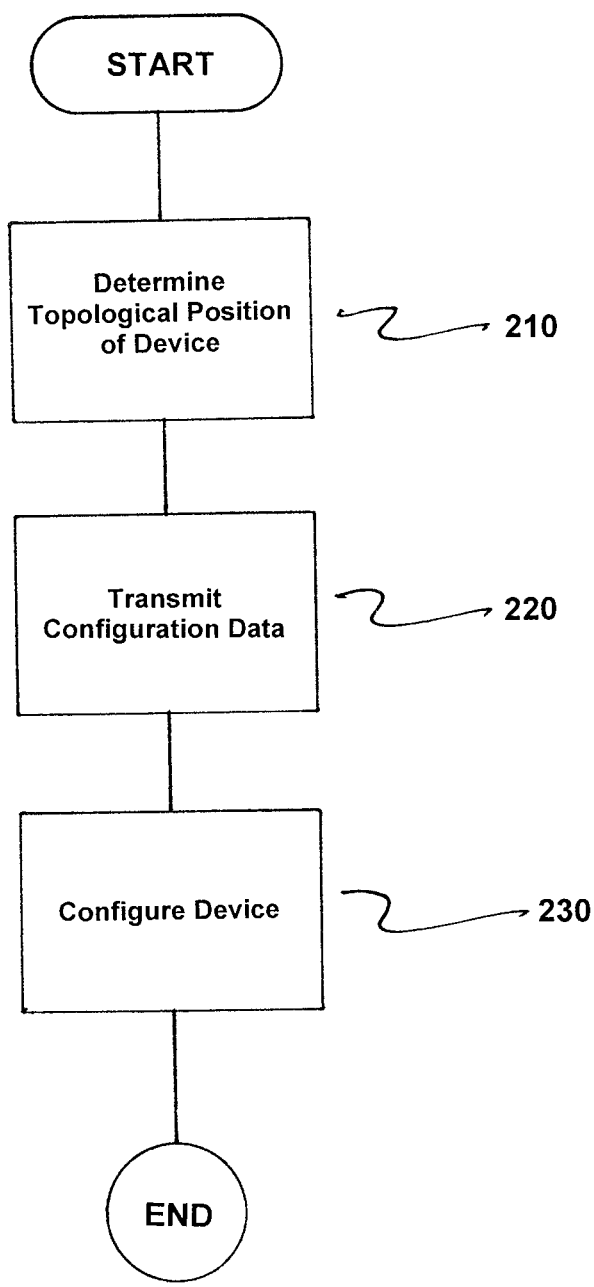
FIG. 2 is a flowchart of the method in according with an embodiment of the invention.

FIG. 2 is a flowchart of a method for configuring at least one device in an Ethernet-based communication network comprising a plurality of Ethernet-capable devices. The method comprises determining a topological position of the at least one device in the communication network for a particular device of the plurality of Ethernet-capable devices which is to be configured and which is assigned to a device type, as indicated in step 210.

Next, configuration data corresponding to the device type of the particular device and the determined topological position is transmitted to a respective device from a database which contains a plurality of configuration data for the at least one device type and different topological positions of the at least one device type, as indicated in step 220.

The respective device is then configured based on the transmitted configuration data, as indicated in step 230.

While there have been shown, described, and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for configuring at least one device in an Ethernet-based communication network comprising a plurality of Ethernet-enabled devices, comprising:
    determining, via a Link Layer Discover Protocol, a topological position of the at least one device in the communication network for a particular device of the plurality of Ethernet-enabled devices which is to be configured and which is assigned to a device type of at least one device type;
    downloading configuration data corresponding to the device type of the particular device and the determined topological position to a respective device from a database which contains a plurality of configuration data to configure the at least one device type, the assigned device type and different topological positions of the at least one device type; and
    configuring the respective device based on the downloaded configuration data;
    wherein the respective device required to be configured contacts the database automatically and after contacting the database said respective device performs said download from the database of the configuration data corresponding to the device type and determined topological position of the respective device;
    wherein the method is implemented in a communication network of an automation system;
    wherein the at least one device required to be configured comprises at least one of at least one Ethernet switch and at least one field device; and
    wherein at least some of the field devices contain an integrated Ethernet switch.

2. The method as claimed in claim 1, wherein the database is administered by a monitoring station in the Ethernet-based communication network.

3. The method as claimed in claim 1, wherein the topological position of the respective device indicates direct connections present in the communication network between the respective device and other devices of the plurality of devices based on addresses of directly connected devices and ports of said directly connected devices used for a direct connection.

4. The method as claimed in claim 2, wherein the topological position of the respective device indicates direct connections present in the communication network between the respective device and other devices of the plurality of devices based on addresses of directly connected devices and ports of said directly connected devices used for a direct connection.

5. The method as claimed in claim 1, wherein a Simple Network Management Protocol (SNMP) is used during transmittal of the configuration data.

6. The method as claimed in claim 1, further comprising:
    contacting, automatically by the respective device required to be configured, the database, communicating by the respective device, its device type and its determined topological position to the database while contacting the database; and
    sending from the database the corresponding configuration data to the respective device.

7. The method as claimed in claim 1, wherein the database detects a presence of the respective device required to be configured and automatically sends the configuration data corresponding to its device type and its determined topological position to the detected device.

8. The method as claimed in claim 1, wherein the communication network is based on Industrial Ethernet.

9. The method as claimed in claim 8, wherein the Industrial Ethernet is based on Profinet.

10. The method as claimed in claim 1, wherein the automation system is at least one of an industrial automation system and a building automation system.

11. An Ethernet-based communication network comprising a multiplicity of Ethernet-enabled devices, wherein the Ethernet-based communication network is configured to:
    determine, via a Link Layer Discover Protocol, a topological position of the at least one device in the communication network for a particular device of the plurality of Ethernet-enabled devices which is to be configured and which is assigned to a device type of at least one device type;
    download configuration data corresponding to the device type of the particular device and the determined topological position to a respective device from a database which contains a plurality of configuration data to configure the at least one device type, the assigned device type and different topological positions of the at least one device type; and
    configure the respective device based on the downloaded configuration data;
    wherein the respective device required to be configured contacts the database automatically and after contacting the database said respective device performs said download from the database of the configuration data corresponding to the device type and determined topological position of the respective device;

wherein the method is implemented in a communication network of an automation system;

wherein the at least one device required to be configured comprises at least one of at least one Ethernet switch and at least one field device; and wherein at least some of the field devices contain an integrated Ethernet switch.

* * * * *